United States Patent [19]

Nix

[11] Patent Number: 4,897,810
[45] Date of Patent: Jan. 30, 1990

[54] ASYNCHRONOUS INTERRUPT STATUS BIT CIRCUIT

[75] Inventor: Michael A. Nix, Austin, Tex.
[73] Assignee: Advanced Micro Devices, Inc., Sunnyvale, Calif.
[21] Appl. No.: 318,098
[22] Filed: Mar. 2, 1989

Related U.S. Application Data

[62] Division of Ser. No. 205,636, Jun. 13, 1988, Pat. No. 4,862,409.

[51] Int. Cl.$^4$ .............................................. G06F 9/00
[52] U.S. Cl. ................................... 364/900; 364/941; 364/941.5; 364/941.6; 364/941.8
[58] Field of Search .............................. 364/900, 200

[56] References Cited

U.S. PATENT DOCUMENTS 4,716,523 12/1987 Burrus, Jr. et al. .................. 364/200

Primary Examiner—Gareth D. Shaw
Assistant Examiner—John G. Mills
Attorney, Agent, or Firm—Davis Chin

[57] ABSTRACT

An asynchronous interrupt status bit circuit for use in conjunction with a microprocessor, which guarantees that no interrupting conditions are missed and that no single interrupting condition is indicated twice, includes a master latch (12), a transfer gate (14), a clocked latch (16), an inverter (18), an output driver circuit (20), and a clearing circuit (22, 24). The master latch (12) is responsive to an interrupt input signal for generating an interrupting logic signal at its output which is latched to a low logic level. The clearing circuit (22, 24) is responsive to a control signal for generating a clear signal to clear the output of the master latch (12) to a high level only when the control signal is latched at a high level before the time a true read signal is making a high-to-low transition. The next read signal causes an output signal having a low level to be read by the microprocessor if no interrupt input signal has occured.

6 Claims, 2 Drawing Sheets (a) IN
(b) READ
(c) DBX

*NORMAL OPERATION (a) IN
(b) READ
(c) DBX

*INCORRECT OPERATION WITH EXCESSIVELY LONG INPUT PULSE (a) IN
(b) READ
(c) DBX

*OPERATION WHEN READ IS COINCIDENT WITH THE INPUT
*READ JUST BEFORE IN
*READ JUST AFTER IN

ASYNCHRONOUS INTERRUPT STATUS BIT CIRCUIT

This application is a division of application Ser. No. 205,636, filed June 13, 1988, now U.S. Pat. No. 4,862,409.

BACKGROUND OF THE INVENTION

This invention relates generally to digital integrated circuits for use in data processing computing systems and more particularly, it relates to an asynchronous interrupt status bit circuit which allows no interrupt signals to be missed and prevents a single interrupting signal from being read twice by a host microprocessor.

As is generally known in the microprocessor art, a host microprocessor has the capability of responding to an interrupt input or status signal via an interrupt controller, which operates, upon receipt of a signal, to cause the microprocessor to respond to particular preprogrammed routines under the control of an interrupt program. Most interrupt signals are not due to error conditions but will be part of the normal operation of the system. These interrupt routines are important for many reasons, such as for servicing memory management access violations, input/output devices, and the system clock. For example, such an interrupt signal from an integral timer is used to periodically interrupt the microprocessor so as to keep track of the time. In the event of the receipt of such an interrupt, the interrupt controller sends an interrupt to the microprocessor which causes the microprocessor to send out a read signal to determine what type of interrupt has been requested. The read signal permits the microprocessor to read related interrupt status registers which generate output signals to the microprocessor.

Since interrupt or status signals are asynchronous, which means that they can occur at any time in relationship to the read signal, there has been encountered problems heretofore when the asynchronous interrupt signal and the read signal happen at substantially the same time. In particular, the interrupt signal could be not read or missed, or the interrupt signal could be read twice for a single interrupting condition depending upon if the read signal occurs slightly before or slightly after the interrupt signal. Accordingly, it would therefore be desirable to provide an asynchronous interrupt status bit circuit which guarantees that no interrupting conditions are missed and that no single interrupting condition is indicated twice.

SUMMARY OF THE INVENTION

Accordingly, it is a general object of the present invention to provide an asynchronous interrupt status bit circuit which is relatively simple and economical to manufacture and assemble, but has been traditionally unavailable.

It is an object of the present invention to provide an asynchronous interrupt status bit circuit which guarantees that no interrupting conditions are missed and that no single interrupting condition is indicated twice.

It is an object of the present invention to provide an asynchronous interrupt status bit circuit which includes a master latch, a clocked latch, an output driver circuit and a clearing latch circuit.

It is still another object of the present invention to provide an asynchronous interrupt bit circuit which includes a master latch and a clearing circuit which is responsive to a control signal for clearing the master latch after reading of a high logic level.

In accordance with these aims and objectives, the present invention is concerned with the provision of an asynchronous interrupt status bit circuit for use in conjunction with a microprocessor so as to guarantee that no interrupting conditions are missed and that no single interrupting condition is indicated twice. The interrupt status bit circuit includes a master latch, a transfer gate, a clocked latch, an inverter, an output driver circuit, and a clearing circuit. The master latch has an output and is responsive to an interrupt input signal for generating an interrupting logic signal at its output which is latched to a low logic level. The transfer gate is responsive to true and complement read signals generated by the microprocessor for passing the interrupting signal received on its signal input node to its signal output node when the true read signal is at a low logic level and the complement read signal is at the high logic level. The clocked latch has an input and an output and is coupled to the signal output node of the transfer gate for latching its output to the logic level of the interrupting signal when the true read signal is at a high logic level. The inverter has an input and an output. The input of the inverter is coupled to the output of the clocked latch and is used to generate a control signal at its output.

The output driver circuit is responsive to the control signal and the true and complement read signals for generating an output signal which is fed to the microprocessor so as to indicate reading of an interrupting condition when it is at a high level. The clearing circuit is responsive to the cotnrol signal and the true and complement read signals for generating a clear signal to clear the output of the master latch to a high logic level only when the interrupting signal at the output of the clocked latch is latched at a low level before the time when the true read signal is making a high-to-low transition. The next read signal causes the output signal to produce a low logic level if no interrupt input signal has occurred again.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
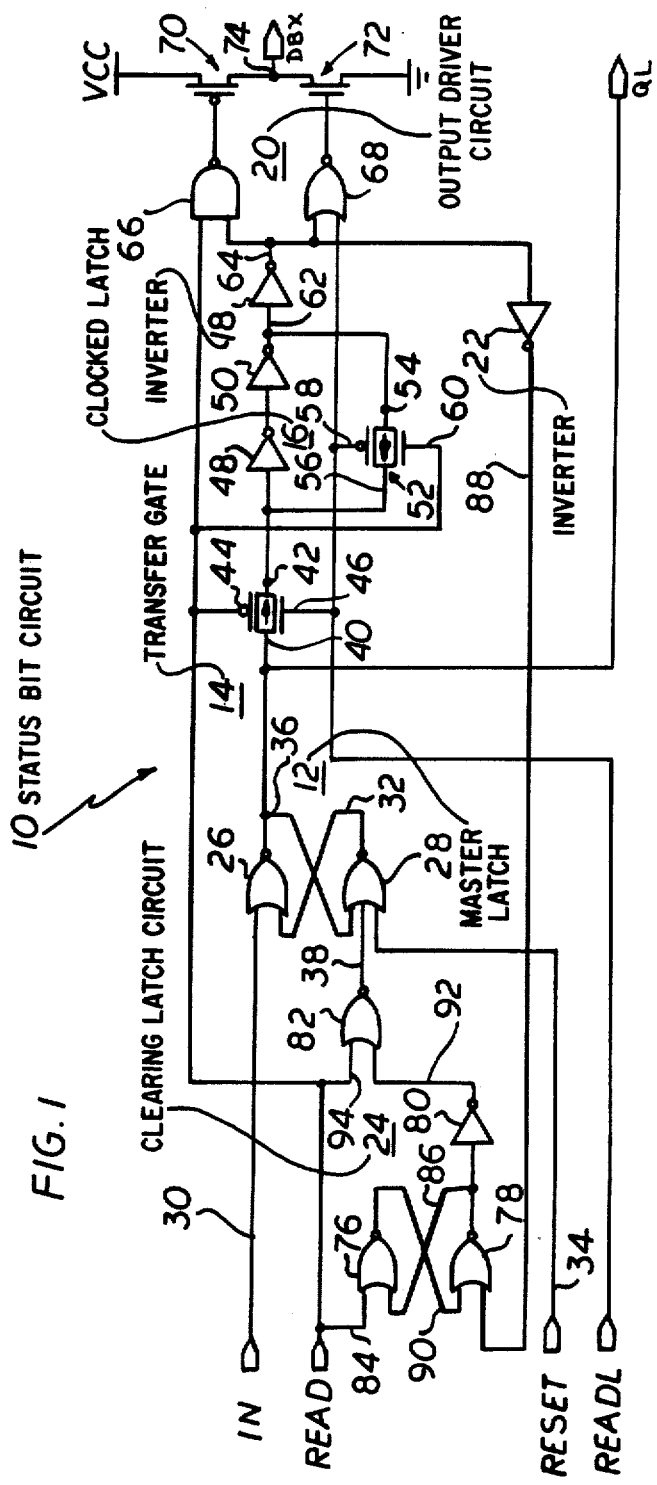
FIG. 1 is a schematic circuit diagram of an asynchronous interrupt status bit circuit, constructed in accordance with the principles of the present invention.

Referring now in detail to the drawings, there is shown in FIG. 1 a schematic circuit diagram of an asynchronous interrupt status bit circuit 10 of the present invention. The status bit circuit 10 includes a master flip-flop or latch 12, a transfer gate 14, a clocked latch 16, an inverter 18, an output driver circuit 20. The status bit circuit 10 also includes an inverter 22 and a clearing flip-flop or latch circuit 24.

The master latch 12 is formed of a pair of cross-coupled NOR logic gates 26, 28. One input of the NOR gate 26 is connected to receive an interrupt input or status signal IN indicative of an interrupting condition on line 30. The other input of the NOR gate 26 is connected to the output of the NOR gate 28 on line 32. One input of the NOR gate 28 is connected to receive a reset signal RESET on line 34. A second input of the NOR gate 28 is connected to the output of the NOR gate 26 on line 36. A third input of the NOR gate 28 is connected to the output of the clearing circuit 24 on line 38. The output of the NOR gate 26 provides an interrupting logic signal QL which is fed to an input terminal of a host microprocessor (not shown) via an interrupt controller (not shown).

The transfer gate 14 is a conventional CMOS transmission gate formed of a P-channel MOS transistor and an N-channel MOS transistor. The transmission gate 14 has a signal input node 40, a signal output node 42, a first control terminal 44, and a second control terminal 46. The first control terminal 44 is connected to the gate electrode of the P-channel transistor and the second control terminal 46 is connected to the gate electrode of the N-channel transistor. The output of the NOR gate 26 is also fed to the signal input node 40 of the transmission gate 14. The transmission gate 14 has its signal output node 42 connected to the input of the clocked latch 16. The first control terminal 44 of the transmission gate 14 is connected to receive a true read signal READ, and the second control terminal 46 is connected to receive a false or complement read signal READL. The true and complement read signals READ and READL are generated from the hose microprocessor.

The clocked latch 16 is formed of inverters 48, 50 and a transfer gate 52. The transfer gate 52 is likewise a conventional CMOS transmission gate formed of a P-channel MOS transistor and an N-channel MOS transistor. The transmission gate 52 has a signal input node 54, a signal output node 56, a first control terminal 58, and a second control terminal 60. The first control terminal 58 is connected to the gate electrode of the P-channel transistor, and the second control terminal 60 is connected to the gate electrode of the N-channel transistor. The inverter 48 has its input connected to the signal output node 42 of the transmission gate 14 and has its output connected to the input of the inverter 50. The output of the inverter 50 is connected to the signal input node 54 of the transmission gate 52, and the signal output node 56 of the transmission gate 52 is connected to the input of the inverter 48. The transmission gate 52 also has its first control terminal 58 connected to receive the complement read signal READL and has its second control terminal 60 connected to receive the true read signal READ.

When the true read signal is at a low or logic "0" level and the complement read signal is at a high or logic "1" level, a signal applied to the signal input node 40 will be coupled to the signal output node 42. Thus, the transmission gate 14 is defined to be closed or turned on. On the other hand, the signal applied to the signal input node 54 will not be coupled to the signal output node 56. Thus, the transmission gate 52 is defined to be opened or turned off. When the true read signal is at the high logic level and the complement read signal is at the low logic level, the signal applied to the signal input node 40 will not be coupled to the signal output node 42. Thus, under this condition the transmission gate 14 will be open or turned off. However, the signal applied to the signal input node 54 will be coupled to the signal output node 56. Thus, the transmission gate 52 will be closed or turned on in this condition.

The output of the inverter 50 is connected to the input of the inverter 18 on line 62. The output of the inverter 18 on line 64 defining a control signal is connected to the input of the output driver circuit 20. The output driver circuit 20 includes a NAND logic gate 66, a NOR logic gate 68, a P-channel MOS field-effect transistor 70, and an N-channel MOS field-effect transistor 72. The NAND gate 66 has its one input connected to the output of the inverter 18 on the line 64 and its other input connected to the true read signal READ. The output of the NAND gate 66 is connected to the gate electrode of the P-channel transistor 70. The NOR gate 68 has its one input also connected to the output of the inverter 18 and its other input connected to the complement read signal READL. The output of the NOR gate 68 is connected to the gate electrode of the N-channel transistor 72. The transistor 70 has its source connected to a supply potential or voltage VCC and its drain connected to an output node 74 for generating an output signal DBX. This output signal DBX is sent to the microprocessor so as to indicate a reading of the clocked latch 16. The transistor 72 has its drain also connected to the output node 72 and its source connected to a ground potential.

The output of the inverter 18 on the line 64 is also fed to the input of the inverter 22. The output of the inverter 22 is fed to the input of the clearing latch circuit 24. The clearing latch circuit includes a pair of cross-coupled NOR logic gates 76 and 78, an inverter 80, and a NOR logic gate 82. The NOR gate 76 has its one input on line 84 connected to receive the read signal READ and its other input connected to the output of the NOR gate 78 on line 86. The NOR gate 78 has its one input connected to the output of the inverter 22 on line 88 and its other input connected to the output of the NOR gate 76 on line 90. The output of the NOR gate 78 is also connected to the input of the inverter 80. The output of the inverter on line 92 is connected to one input of the NOR logic gate 82. The other input of the NOR gate 82 on line 94 is connected to receive the true read signal READ. The output of the NOR gate 82 defining the output of the clearing circuit 24 is connected to the third input of the NOR gate 28 of the master latch 12 on the line 38.

Figure 2:
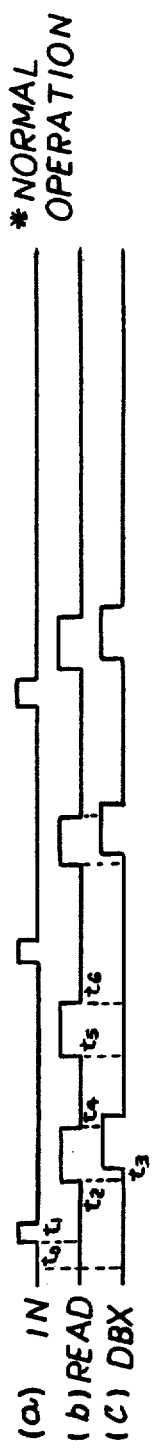
FIGS. 2(a)-2(c) are waveforms useful in understanding of the normal operation of the status bit circuit of FIG. 1.

In order to facilitate the understanding of the normal operation of the interrupt status bit circuit 10 of FIG. 1, reference is now made to the waveforms illustrated in FIGS. 2(a)–2(c). Initially, it is assumed that a reset signal consisting of a short pulse has been applied to the line 34. When the reset signal makes a low-to-high transition, this causes the output of the NOR gate 28 to be set at a low or logic "0" level. Since the interrupt input or status signal IN is at a low logic level at time t0 as shown in FIG. 2(a), the output of the NOR gate 26 will be set at a high or logic "1" level. With the true read signal READ being at the low logic level (READ=0) and the complement read signal READL being at the high logic level (READL=1) at the time t0, the transmission gate 15 will be turned on and the transmission gate 52 will be turned off. As a result, the clocked latch 16 will be transparent so as to allow the high logic level at the output of the NOR gate 26, which is passed through the transmission gate 14, to reach the output of the inverter 50. Due to the inverter 18, a low logic level control signal will be applied to the input of the output driver circuit 20. However, the output of the NAND gate 66 will be at a high logic level and the output of the NOR gate 68 will be at a low logic level, thereby rendering the output signal on the node 74 to be in a high impedance mode.

Further, due to the inverter 22, a high logic level on the line 88 will be applied to the NOR gate 78, causing its output on line 86 to go to a low level. Since the true read signal being at the low level is also applied to the input of the NOR gate 76 on the line 84, the output of the NOR gate 76 will also be initially at the high level. With the output of the inverter 80 being at the high level and with the true read signal on the line 94 of the gate 82 being at the low level, the output of the NOR gate 82 will be at a low level.

At the time t1, the interrupt input signal IN goes to a logic "1" level indicating an interrupting condition. This causes the output of the NOR gate 26 of the master latch 12 to change to the low or logic "0" level. The output of the NOR gate 26 defining the output of the master latch represents an interrupting logic signal which is sent to the microprocessor via the interrupt controller to indicate the occurrence of the interrupting condition. Since the true read signal READ from the microprocessor is at the low level at the time t1, the transmission gate 14 will be closed and the transmission gate 52 will be opened. As a result, the output of the NOR gate 26 will also be sent through the transmission gate 14 to the output of the clocked latch 16 defined by the output of the inverter 50. Thus, the output of the inverter 18 on the line 64 will be at a high level.

At the time t2 when the true read signal READ changes to the high level, the transmission gate 14 will be opened and the transmission gate 52 will be closed so as to latch the output of the inverter 50 at the low level. Further, this causes the output of the NAND gate 66 to switch to the low level thereby turning on the P-channel transistor 70. Consequently, the output signal DBX will be changed to a high level at the time t3 to provide a reading of the clocked latch 16 by the microprocessor.

In addition, at the time t2, the output of the NOR gate 76 will simultaneously switch to the low level and the output of the NOR gate 78 will change to the high level. Further, the output of the inverter 80 will change from the high level to the low level. At the time t4 on the trailing edge of the true read signal making a high-to-low transition, this will cause the output of the NOR gate 82 to make a low-to-high transition which, in turn, causes the output of the NOR gate 28 of the master latch to change to the low level. This results in the clearing of the master latch in which the output of the NOR gate 26 is returned to the high level.

When the next true read signal goes to a high level at the time t5, the output of the NOR gate 26 being at the high level will be latched in the clocked latch 16 at the output of the inverter 50. Simultaneously, the output of the NOR gate 68 will be switched to a high level, thereby turning on the N-channel transistor 72. Therefore, the output signal DBX will be at the low level indicating that there is no interrupt condition existing since another status input signal has not occurred.

It should be noted that the low level at the output of the inverter 18 is fed back to the NOR gate 78 which causes the output thereof to switch back to the low level. Further, the output of the inverter 80 is returned to the high level. Accordingly, when the second read signal READ makes the high-to-low transition at the time t6, it will have no effect on the master latch whose output on the line 36 is maintained at the high level.

Figure 3:
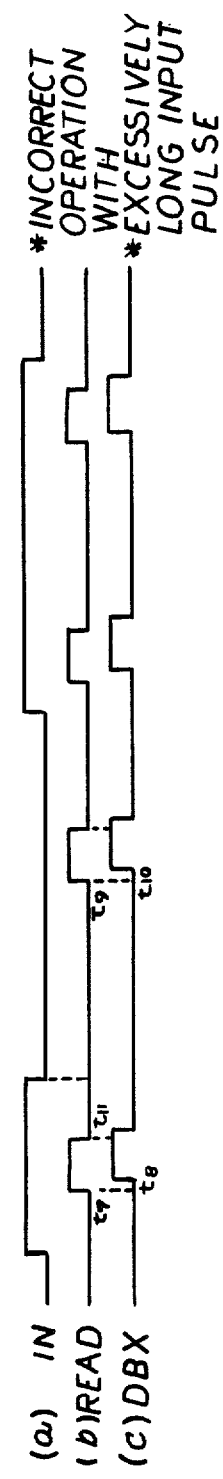
FIGS. 3(a)-3(c) are waveforms useful in explaining the incorrect operation of the status bit circuit of FIG. 1.

In FIG. 3(a), there is shown an interrupt input signal IN which is excessively long in duration, causing an erroneous reading of two consecutive logic "1" for a single status event. As is shown in respective FIGS. 3(b) and 3(c), the reading taken at the times t7 and t9 will produce each time an output signal having a high level at corresponding times t8 and t10. While the output of the NOR gate 26 will be cleared at the time t11 when the trailing edge of the true read signal makes the high-to-low transition, the status input signal being still at the high level after the time t11 will cause the output of the NOR gate to be changed again, indicating another interrupting condition. Therefore, when the second reading occurs at the time t9 the output signal DBX having a high level will be generated. Accordingly, such long interrupt input signals are not acceptable for proper operation of the present interrupt status bit circuit.

Figure 4:
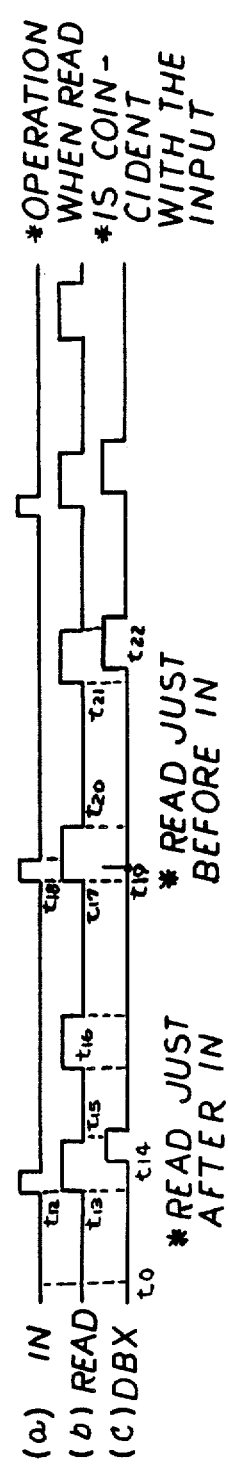
FIGS. 4(a)-4(c) are waveforms useful in understanding the operation of the status bit circuit of FIG. 1 when the read signal is substantially coincident with the interrupting input signal.

In order to explain how the present circuit 10 prevents the missing of a reading of an interrupt signal which changes at the beginning of a read signal, reference is made to the waveforms illustrated in FIGS. 4(a)-4(c). Initially, it will be assumed that a reset signal has been applied again to the line 34. Thus, the outputs of the various logic gates are the same as was previously described with respect to FIG. 1 at the time t0.

In FIG. 4(a), there is shown an interrupt input signal IN occurring at time t12. In FIG. 4(b), there is shown a true read signal occurring at time t13 which is substantially coincident and is very near the time t12 where the interrupt signal IN has changed but is just slightly after the time t12. The output from the NOR gate 26 will have therefore already made the high-to-low transition prior to the read signal READ at the time t13. Thus, the output of the inverter 50 of the clocked latch 16 will be latched at a low logic level. As a result, the control signal at the output of the inverter 18 will be at a high logic level at the time t13. Consequently, the output signal DBX having a high logic level will be read by the microprocessor at the time t14, as shown in FIG. 4(c). Since the output of the NOR gate 26 will be cleared or returned to the high level at the time t15 (trailing edge of the read signal), the next read signal at the time t16 will produce an output signal DBX having a low level corresponding to a no-interrupt condition.

In FIG. 4(a), there is illustrated an interrupt input signal IN occurring at time t18. In FIG. 4(b), there is illustrated a true read signal occurring at time t17 which is substantially coincident and is very near the time t18 when the interrupt input signal IN has changed but is just slightly before the time t18. As a result, the output of the NOR gate 26 will still be at the high level when the read signal occurs at the time t17. Consequently, the output of the inverter 50 of the clocked latch will be latched at a high level. Therefore, the control signal on line 64 will be at a low level when the read signal occurs at the time t17. Thus, the output signal DBX having a low level will be read by the microprocessor at the time t19. However, at the time t18 the output of the NOR gate 26 is switched to a low level indicating an interrupting condition. It is important that this interrupting condition not be missed (not read) by the microprocessor. Since the clocked latch was latched in the high level, the trailing edge of the true read signal at the time t20 will not cause the master latch or the output of the NOR gate 26 to be cleared or returned to the high level.

Accordingly, the low level at the output of the NOR gate 26 will be latched into the clocked latch on the next read signal occurring at the time t21. Thus, the output signal DBX having a high level at the time t22 will be read by the microprocessor as shown in FIG. 4(c). It should now be apparent that the reading of the interrupt input signal occurring at the time t18 was not missed and did not go unread by the microprocessor due to the present interrupt status bit circuit.

While the clocked latch 16 has been described throughout as consisting of only the inverter 48, 50 and the transfer gate 52, it will be understood by those skilled in the art that a true clocked latch is implemented by using the two transmission gates and two inverters. Thus, a true clocked latch would be considered to be formed of the transfer gate 14 as well as the clocked latch 16 illustrated in the status bit circuit 10 of FIG. 1.

From the foregoing detailed description, it can thus be seen that the present invention provides an asynchronous interrupt bit circuit for use in conjunction with a microprocessor which guarantees that no interrupting conditions are missed and that no single interrupting condition is indicated twice. The status bit circuit includes a master latch, a transfer gate, a clocked latch, an inverter, an output drive circuit, and a clering circuit. The clearing circuit is used to clear the master latch only after an output signal having a high level has been read by the microprocessor.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An asynchronous interrupt status bit circuit for use in conjunction with a microprocessor which guarantees that no interrupting conditions are missed and that no single interrupting condition is indicated twice, said circuit comprising:

master latch means (12) responsive to an interrupt input signal for generating an interrupting logic signal which is latched to a low logic level;

clocked latch means (14, 16, 18) responsive to true and complement read signals and said interrupting logic signal for generating a control signal;

output driver means (20) responsive to said control signal and said true and complement read signals for generating an output signal which is fed to the microprocessor so as to indicate reading of an interrupting condition when it is at a high logic level; and said master latch means (12) being further responsive to a clear signal having a high logic level for clearing said interrupting logic signal to a high logic level only when said control signal is latched at a high logic level before the time the true read signal is making a high-to-low transition, whereby the next true read signal causes the output signal to produce a low logic level if no interrupt input signal has occurred again.

2. A status bit circuit as claimed in claim 1, further comprising clearing circuit means responsive to said control signal for generating said clear signal.

3. A status bit circuit as claimed in claim 2, wherein said master latch means (12) comprises first and second cross-coupled NOR gates (26, 28).

4. A status bit circuit as claimed in claim 3, wherein said clocked latch means comprises first and second transmission gates (14, 52) and first, second and third inverters (48, 50, 18), said first transmission gate (14) being interconnected between said master latch means (12) and said first inverter (48); said second inverter being interconnected between said first inverter (48) and said third inverter (18), said second transmission gate (52) being interconnected between the output of said second inverter (50) and the input of said first inverter (46).

5. A status bit circuit as claimed in claim 4, wherein said output driver means (20) comprises a NAND logic gate (66), a third NOR logic gate (68), a P-channel transistor (70) and an N-channel transistor (72).

6. A status bit circuit as claimed in claim 5, wherein said clearing circuit means (22, 24) comprises fourth and fifth inverters (22, 80), fourth, fifth and sixth NOR logic gates (76, 78, 82).

* * * * *